United States Patent
Noda

(10) Patent No.: US 10,948,901 B2
(45) Date of Patent: Mar. 16, 2021

(54) DATA COLLECTION SYSTEM, DATA COLLECTION METHOD, AND CONTROLLER

(71) Applicant: FANUC CORPORATION, Yamanashi (JP)

(72) Inventor: Shinichi Noda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 42 days.

(21) Appl. No.: 16/435,758

(22) Filed: Jun. 10, 2019

(65) Prior Publication Data

US 2020/0012261 A1    Jan. 9, 2020

(30) Foreign Application Priority Data

Jul. 3, 2018  (JP) .............................. JP2018-126657

(51) Int. Cl.
  *G05B 19/418*  (2006.01)
  *G05B 19/406*  (2006.01)
  *G06F 9/54*  (2006.01)
  *G05B 19/408*  (2006.01)

(52) U.S. Cl.
  CPC ....... *G05B 19/4183* (2013.01); *G05B 19/406* (2013.01); *G05B 19/408* (2013.01); *G06F 9/542* (2013.01); *G06F 9/544* (2013.01)

(58) Field of Classification Search
  None
  See application file for complete search history.

(56) References Cited

FOREIGN PATENT DOCUMENTS

| JP | 6-169322 | 6/1994 |
|---|---|---|
| JP | 11-150993 | 6/1999 |
| JP | 2004-102765 | 4/2004 |
| JP | 2004-272506 | 9/2004 |
| JP | 2014-016930 | 1/2014 |
| JP | 2016-113819 | 6/2016 |
| JP | 2017-84290 | 5/2017 |

OTHER PUBLICATIONS

Notification of Reasons for Refusal dated Jun. 9, 2020 in corresponding Japanese Patent Application No. 2018-126657.

*Primary Examiner* — Carlos R Ortiz Rodriguez
(74) *Attorney, Agent, or Firm* — Wenderoth, Lind & Ponack, L.L.P.

(57) ABSTRACT

To provide a data collection system, a data collection method, and a controller capable of transmitting measured data with appropriate timing while reducing load on a controller and a network. A controller comprises: a data acquisition unit that acquires measured data about a machine in chronological order; a timing control unit that buffers the measured data and controls timing of transmitting the measured data to a server based on a transmission condition; a data transmission unit, in response to instruction by the timing control unit, the data transmission unit transmitting the measured data to the server having been buffered until the instruction is given; and a transmission condition acquisition unit that receives the transmission condition decided by the server in response to a degree of state abnormality occurring during control determined based on the transmitted measured data.

9 Claims, 4 Drawing Sheets

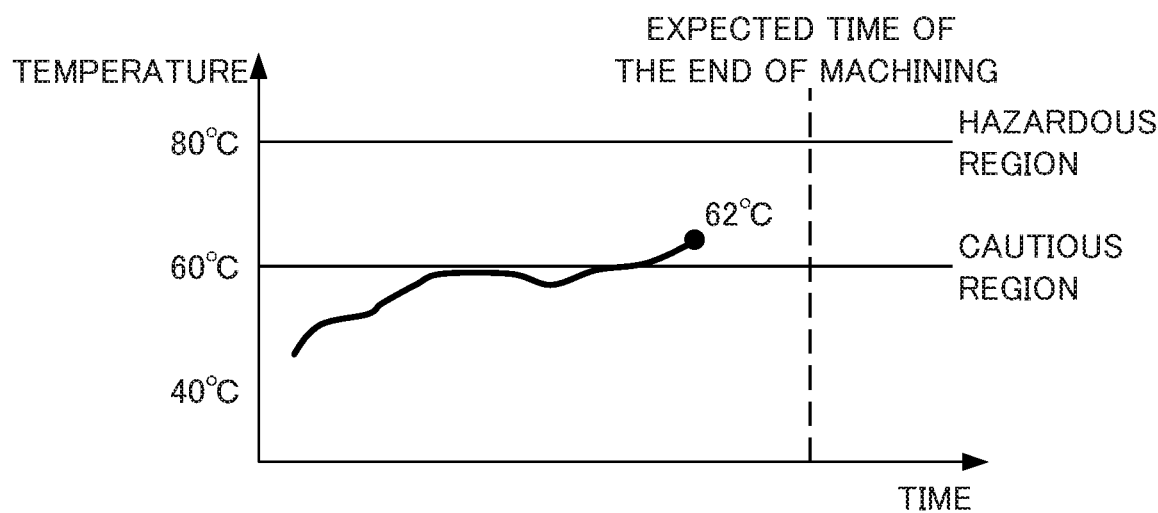
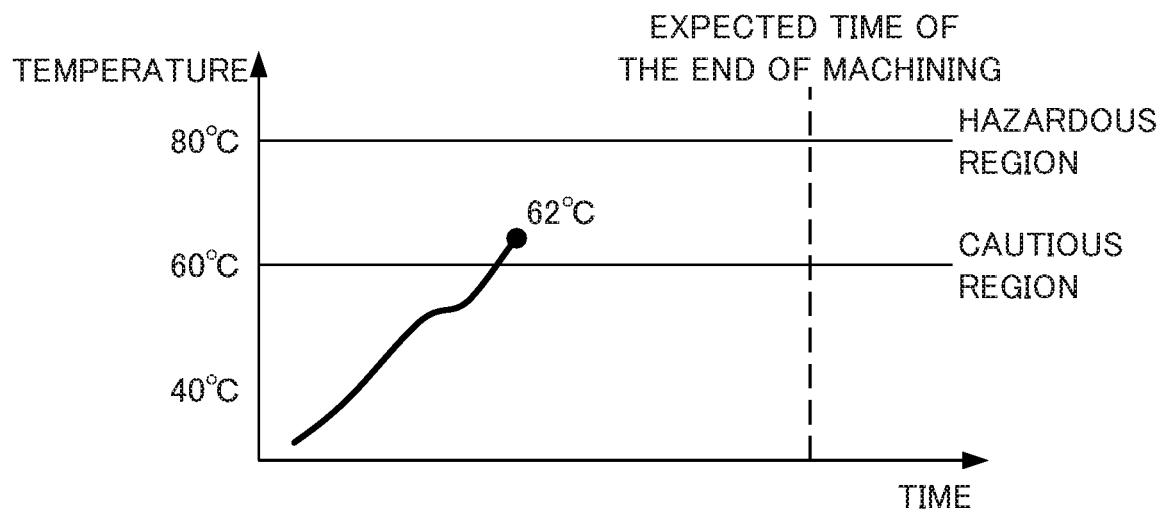

DATA COLLECTION SYSTEM, DATA COLLECTION METHOD, AND CONTROLLER

This application is based on and claims the benefit of priority from Japanese Patent Application No. 2018-126657, filed on 3 Jul. 2018, the content of which is incorporated herein by reference.

BACKGROUND OF THE INVENTION

Field of the Invention

The present invention relates to a system, a method, and a controller for collecting measured data during control of a machine tool, an industrial machine, or a robot, for example.

Related Art

Data measured by a controller for controlling a machine such as a computerized numerical controller (CNC), a robot controller, or a programmable logic controller (PLC) has conventionally been transmitted through a network to a server, and subjected to data analysis on the server for abnormality detection, for example. In this case, if the bandwidth of the network or the processing speed of the controller is not sufficient, transmitting each piece of the measured data is real time becomes difficult. In response to this, the controller gathers multiple pieces of (for example, N pieces of) data and transmits the gathered data at transmission intervals. This achieves saving of the bandwidth and the processing time.

In the case of the foregoing transmission of N pieces of measured data at a constant frequency, however, if an event (abnormal state) corresponding to measured data of a high degree of urgency has occurred, this event is not transmitted to the server until N pieces of measured data are accumulated in the controller. This takes time until the server observes this measured data to cause the problem of failing to handle this measured data promptly. Patent documents 1 and 2 suggest techniques of preventing transmission delay by which, even if the number of pieces of data in a buffer does not reach N, data having been accumulated so far is transmitted immediately on the occurrence of an event.

Patent Document 1: Japanese Unexamined Patent Application, Publication No. H06-169322
Patent Document 2: Japanese Unexamined Patent Application, Publication No. 2017-084290

SUMMARY OF THE INVENTION

According to the foregoing techniques, however, an event has a fixed definition. Hence, inconveniences such as transmitting data frequently under a loose condition or failing to transmit necessary data immediately under a strict condition have caused in a manner that depends on circumstances.

The present invention is intended to provide a data collection system, a data collection method, and a controller capable of transmitting measured data with appropriate timing while reducing load on a controller and a network.

(1) A data collection system according to the present invention (data collection system 1 described later, for example) comprises a controller (controller 10 described later, for example) that controls a machine and a server (server 20 described later, for example) that receives measured data about the machine from the controller. The controller comprises: a data acquisition unit (data acquisition unit 11 described later, for example) that acquires the measured data in chronological order; a timing control unit (timing control unit 13 described later, for example) that buffers the measured data and controls timing of transmitting the measured data to the server based on a transmission condition; a data transmission unit (data transmission unit 14 described later, for example), in response to instruction by the timing control unit, the data transmission unit transmitting the measured data to the server having been buffered until the instruction is given; and a transmission condition acquisition unit (transmission condition acquisition unit 15 described later, for example) that receives the transmission condition from the server. The server comprises: a state determination unit (state determination unit 21 described later, for example) that determines a degree of state abnormality occurring during control based on the received measured data; a transmission condition decision unit (transmission condition decision unit 22 described later, for example) that decides the transmission condition based on a result of the determination by the state determination unit; and a transmission condition notification unit (transmission condition notification unit 23 described later, for example) that notifies the controller of the transmission condition.

(2) In the data collection system described in (1), the controller may comprise an event detection unit (event detection unit 12 described later, for example) that detects the measured data satisfying a determination condition as an event to exert influence on control. The transmission condition decision unit may decide the determination condition as a second transmission condition differing from a first transmission condition containing a transmission frequency defined in advance. The transmission condition acquisition unit may receive the determination condition as the second transmission condition from the server. In addition to transmission with timing defined under the first transmission condition, the timing control unit may instruct the data transmission unit on transmission of the measured data with timing of detection of the event differing from the timing defined under the first transmission condition.

(3) In the data collection system described in (2), the event detection unit may detect the event based on a result of comparison of the measured data with a threshold as the determination condition.

(4) In the data collection system described in any one of (1) to (3), the transmission condition decision unit may decide a first transmission condition containing a defined transmission frequency, and the transmission condition acquisition unit may receive the first transmission condition from the server.

(5) In the data collection system described in any one of (1) to (4), the data acquisition unit may acquire measured data of multiple types each in chronological order, and the transmission condition may be set for measured data of each of the multiple types.

(6) In the data collection system described in any one of (1) to (5), the state determination unit may determine a degree of the state abnormality occurring during the control by integrating multiple pieces of input information including the measured data.

(7) In the data collection system described in any one of (1) to (6), the state determination unit may determine a degree of the state abnormality occurring during the control by estimating variation until the end of the control based on a transition of the measured data.

(8) A data collection method according to the present invention causes a server (server 20 described later, for example) to receive measured data from a controller (controller 10 described later, for example) that controls a machine. The controller executes: a data acquisition step of acquiring the measured data in chronological order; a timing control step of buffering the measured data and controlling timing of transmitting the measured data to the server based on a transmission condition; a data transmission step, in response to instruction by the timing control step, the data transmission step transmitting the measured data to the server having been buffered until the instruction is given; and a transmission condition acquisition step of receiving the transmission condition from the server. The server executes: a state determination step of determining a degree of state abnormality occurring during control based on the received measured data; a transmission condition decision step of deciding the transmission condition based on a result of the determination by the state determination step; and a transmission condition notification step of notifying the controller of the transmission condition.

(9) A controller according to the present invention (controller 10 described later, for example) comprises: a data acquisition unit (data acquisition unit 11 described later, for example) that acquires measured data about a machine in chronological order; a timing control unit (timing control unit 13 described later, for example) that buffers the measured data and controls timing of transmitting the measured data to a server (server 20 described later, for example) based on a transmission condition; a data transmission unit (data transmission unit 14 described later, for example), in response to instruction by the timing control unit, the data transmission unit transmitting the measured data to the server having been buffered until the instruction is given; and a transmission condition acquisition unit (transmission condition acquisition unit 15 described later, for example) that receives the transmission condition decided by the server in response to a degree of state abnormality occurring during control determined based on the transmitted measured data.

According to the present invention, measured data can be transmitted with appropriate timing while load on a controller and a network is reduced.

BRIEF DESCRIPTION OF THE DRAWINGS

FIG. 2B is a second view illustrating a state determination made by the server according to the first embodiment;

FIG. 2C is a third view illustrating a state determination made by the server according to the first embodiment;

DETAILED DESCRIPTION OF THE INVENTION

First Embodiment

Figure 1:
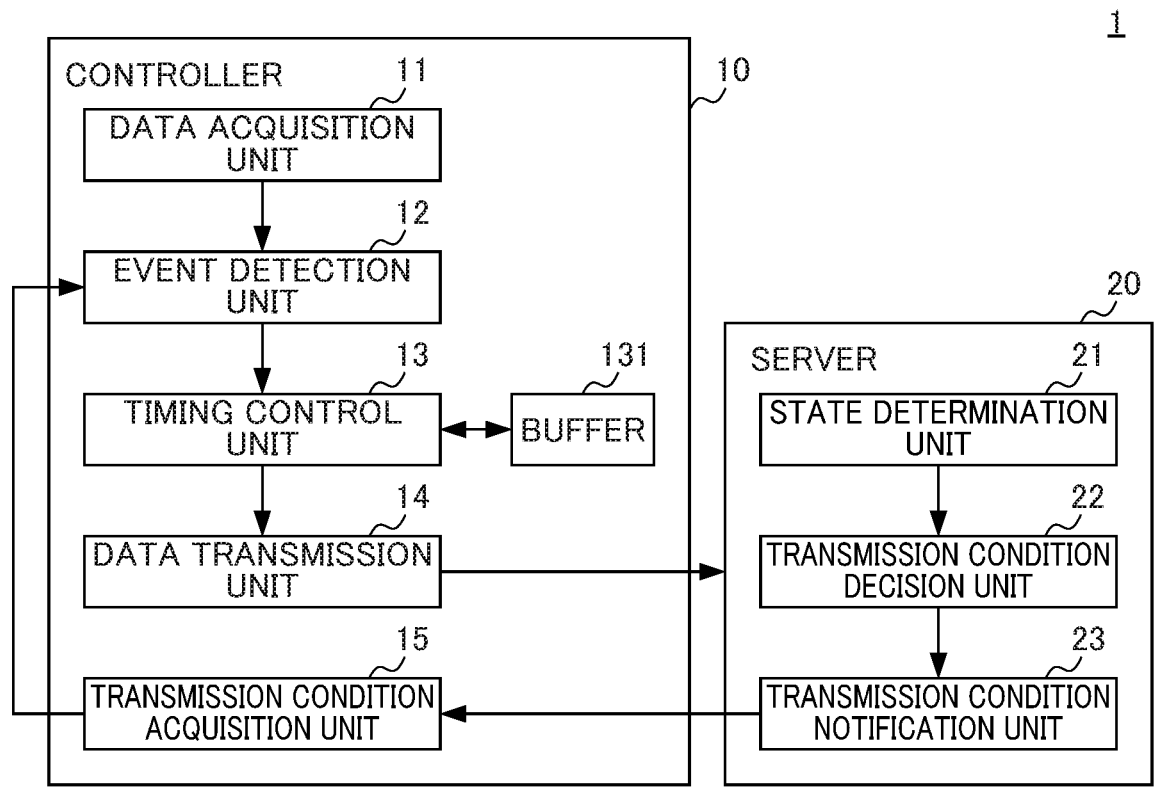
FIG. 1 shows the functional configuration of a data collection system according to a first embodiment.

A first embodiment of the present invention will be described below. FIG. 1 shows the functional configuration of a data collection system 1 according to the first embodiment. The data collection system 1 includes a controller 10 (CNC, for example) that controls a machine, and a server 20 that receives measured data about the machine from the controller 10. The controller 10 and the server 20 can communicate with each other bidirectionaliy through a network.

The controller 10 includes a data acquisition unit 11, an event detection unit 12, a timing control unit 13, a data transmission unit 14, and a transmission condition acquisition unit 15. The server 20 includes a state determination unit 21, a transmission condition decision unit 22, and a transmission condition notification unit 23.

The data acquisition unit 11 acquires measured data in chronological order. The data acquisition unit 11 may acquire measured data of multiple types, each in chronological order, such as speeds, currents, or vibrations on corresponding axes, or temperatures at multiple points, for example in this case, the measured data of the multiple types may be buffered in respective independent groups, and a transmission condition described later may be set for measured data in each of the multiple groups.

When the event detection unit 12 detects measured data satisfying a set determination condition, the event detection unit 12 determines the occurrence of an event likely to exert influence on control and thus subjected to immediate observation by the server 20. For example, the event detection unit 12 detects an event based on a result of comparison of measured data with a threshold as the determination condition. More specifically, if a value of the measured data exceeds or falls below the threshold, or falls within a predetermined range, the event detection unit 12 determines the occurrence of an event. As another example, if measured data takes a value indicating any one of multiple states of the machine and if the value of the measured data becomes a particular value indicating a warning, the event detection unit 12 may determine the occurrence of an event.

The timing control unit 13 stores measured data into a buffer 131, and controls timing of transmitting the accumulated measured data to the server 20 based on a transmission condition. More specifically, in addition to transmission with timing defining a predetermined frequency under a first transmission condition, the timing control unit 13 instructs the data transmission unit 14 on transmission of measured data with timing of detection of an event differing from the former regular timing.

In response to the instruction by the timing control unit 13, the data transmission unit 14 gathers measured data in each group having been accumulated in the buffer 131 until the instruction is given, generates a communication header, and transmits the measured data and the communication header to the server 20.

The transmission condition acquisition unit 15 receives a decided transmission condition from the server 20. In the first embodiment, the transmission condition includes a first transmission condition containing a transmission frequency defined using the number of pieces of data accumulated in the buffer 131 or the volume of such data, or a transmission cycle, for example, and a second transmission condition containing a defined determination condition for detecting the occurrence of an event to exert influence on control. As the second transmission condition, the transmission condition acquisition unit 15 receives a determination condition from the server 20 for determining an event based on measured data.

The state determination unit 21 determines a degree of state abnormality occurring during control based on measured data in one or multiple groups received by the server 20. If the measured data exceeds a threshold, the state determination unit 21 determines a degree of the state abnormality in terms of whether change leading to the excess over the threshold is temporal, whether this change is gentle increase not to cause any problem during the control, or whether this change is steep increase necessitating prompt handling, for example.

For this determination of a degree of the state abnormality, the state determination unit 21 may use a transition of measured data in multiple groups, and measured data having been collected and accumulated by the server 20 in the past and its related information. For example, if abnormality such as high temperature is observed at only one of multiple temperature sensors installed on corresponding positions of the machine, this abnormality may be noise. In this case, the state determination unit 21 may determine a degree of the state abnormality based on a value transition until the abnormality is observed. In another case, if a similar performance was observed in the past, the state determination unit 21 may acquire state information about the machine studied at that time to determine a degree of the state abnormality.

The state determination unit 21 may determine a degree of state abnormality occurring during control by integrating multiple types of input information including measured data acquired from the controller 10. If machining by a machine tool is to be controlled, for example, the state determination unit 21 may determine a degree of the state abnormality occurring during the machining more correctly by receiving data in a different group from a different robot, machine, or a measuring device involved in the same machining as the machine tool. The state determination unit 21 may determine a degree of the state abnormality occurring during the control by estimating the variation of measured data until the end of the control based on a transition of the measured data.

The transmission condition decision unit 22 decides a determination condition for determining an event as the second transmission condition for each group of measured data based on a result of the determination by the state determination unit 21. For example, the transmission condition decision unit 22 determines temporal abnormality in measured data to be noise, and disregards this abnormal value. If abnormality in measured data is of such a degree as not to cause any problem until the end of control, the transmission condition decision unit 22 changes a determination condition for determining an event to avoid unnecessary transmission of measured data.

A threshold as a determination condition for determining an event may be set using a difference from past data, a relative value such as a ratio, or an absolute value. Alternatively, the threshold may be decided through machine learning or statistical processing using past data, for example.

If measured data changes steeply to exert influence on control, the server 20 may output a warning, or instruct the controller 10 to change a parameter such as a processing speed automatically. In order to avoid the occurrence of defective parts, for example, timing of changing a parameter is determined to be a break between blocks in a machining program, for example, so as not to exert influence on a control target.

The transmission condition notification unit 23 changes collection timing of collecting measured data by transmitting the second transmission condition decided by the transmission condition decision unit 22 to the controller 10.

Figure 2A:
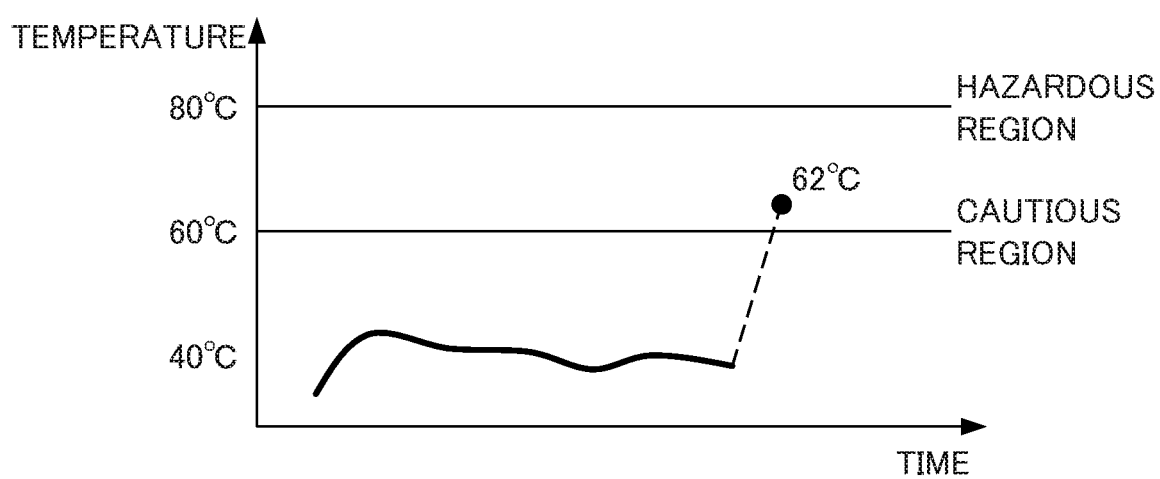
FIG. 2A is a first view illustrating a state determination made by a server according to the first embodiment.

FIG. 2A is a first view illustrating a state determination made by the server 20 according to the first embodiment. In this example, time-series temperature data is collected as measured data. If a temperature exceeds 60° C., the server 20 determines that this temperature is in a cautious region. If a temperature exceeds 80° C., the server 20 determines that this temperature is in a hazardous region.

If a temperature of 62° C. exceeding the threshold of 60° C. indicating the cautious region is detected as an event, the server 20 determines a degree of state abnormality based on data transition in the past. In this example, this temperature change is too steep compared to the past transition. Hence, this temperature change is highly likely to be noise. In this case, the state determination unit 21 disregards this one-time abnormal value or such abnormal values observed several times.

FIG. 2B is a second view illustrating a state determination made by the server 20 according to the first embodiment. In this example, like in FIG. 2A, a temperature of 62° C. exceeding the threshold of 60° C. indicating the cautious region is detected as an event.

The state determination unit 21 acquires a transition of temperature data having been observed so far and expected time of the end of machining together. Then, the state determination unit 21 estimates a temperature at this expected time of the end of machining. A known method is available for this estimation. A temperature may be estimated on an approximate line or an approximate curve.

In this example, the temperature exhibits a gentle upward tendency and is determined not to reach the hazardous region before the expected time of the end of machining. Thus, a degree of state abnormality is lower than a degree determined if the temperature reaches the hazardous region. In this case, the transmission condition decision unit 22 proceeds for continuation of the machining by changing the threshold as a determination condition for determining an event from 60° C. to 70° C. to prevent frequent transmission of pieces of measured data of similar degrees, for example.

FIG. 2C is a third view illustrating a state determination made by the server 20 according to the first embodiment. In this example, like in FIG. 2B, a transition of temperature data having been observed so far and expected time of the end of machining are acquired together.

Steep temperature increase is observed, and a temperature at the expected time of the end of machining is estimated to reach the hazardous region. Then, as a response to the urgency, the server 20 instructs the controller 10 to make a parameter change such as reduction in a machining speed, for example.

Figure 3:
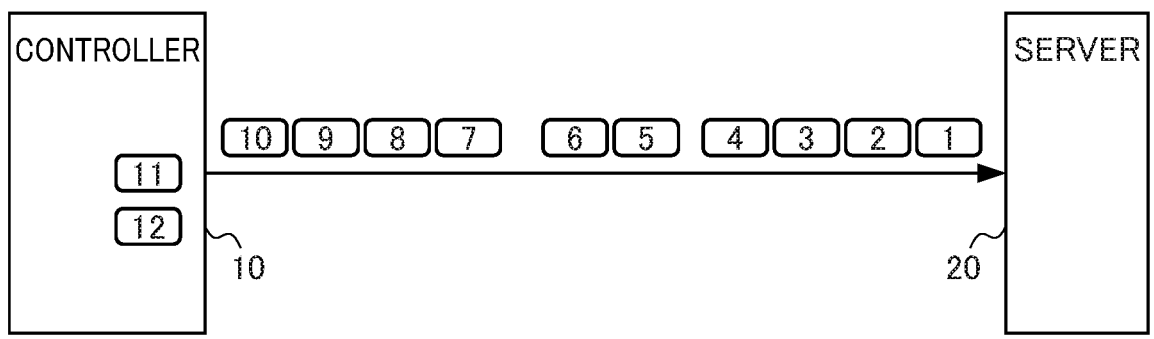
FIG. 3 shows a first example of a data collection method under a fixed transmission condition according to the first embodiment.

FIG. 3 shows a first example of a data collection method under a fixed transmission condition according to the first embodiment. In this example, each time the controller 10 acquires measured data, the controller 10 transmits the measured data to the server 20.

In this case, the controller 10 transmits the acquired measured data immediately, so that not large delay occurs in data observation by the server 20. Meanwhile, as a result of the high frequency of transmission processing, a used bandwidth of the network is increased and time required for the transmission processing is extended.

Figure 4:
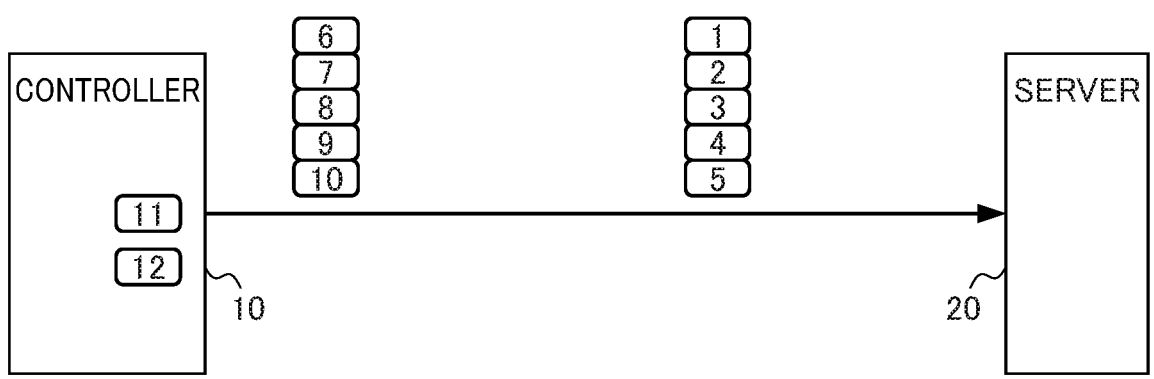
FIG. 4 shows a second example of the data collection method under a fixed transmission condition according to the first embodiment.

FIG. 4 shows a second example of the data collection method under a fixed transmission condition according to the first embodiment. In this example, the controller 10 stores measured data once into the buffer 131, and transmits the measured data at a predetermined frequency to the server 20. Data of a predetermined number of pieces (N pieces) is shown as an example for the frequency. However, this is not the only frequency. Measured data may be transmitted at predetermined time intervals, or may be transmitted regularly based on a data volume or a ratio to a buffer size, for example.

In this case, transmission of measured data already acquired is delayed until N (for example, five) pieces of measured data are accumulated in the buffer 131. This extends a timing interval for transmission of measured data to cause large delay in data observation by the server 20. Meanwhile, this reduces the frequency of transmission processing, thereby reducing a used bandwidth of the n work and shortening time required for the transmission processing.

Figure 5:
FIG. 5 shows a third example of the data collection method under a fixed transmission condition according to the first embodiment.

FIG. 5 shows a third example of the data collection method under a fixed transmission condition according to the first embodiment. In this example, when the controller 10 detects the occurrence of an event necessitating observation with a high degree of importance by acquiring measured data (data 13) in a different range from normal, the controller 10 transmits measured data (data pieces 11 to 13) having been accumulated so far in the buffer 131 with this timing to the server 20 independently of a normal frequency such as that shown in FIG. 4.

In this case, while a used bandwidth of the network is reduced and shortened time required for transmission processing is maintained, delay in observation by the server 20 is reduced on the occurrence of the event.

Figure 6:
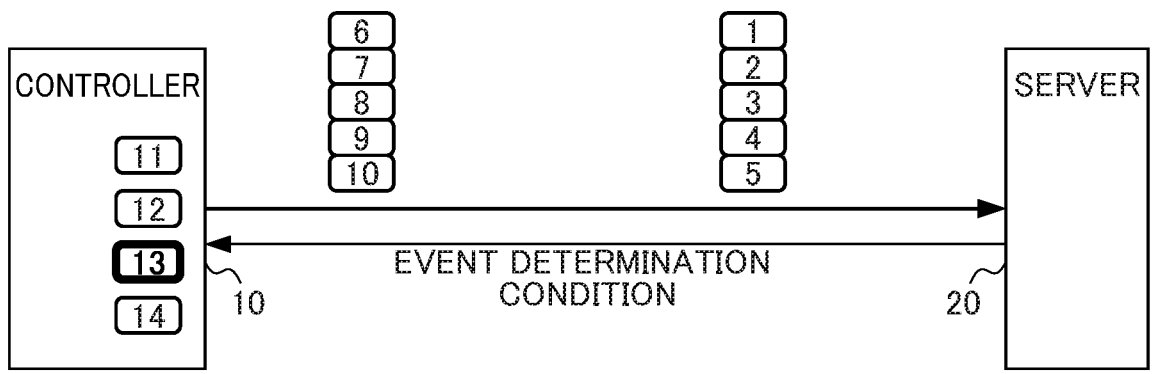
FIG. 6 shows an example of the data collection method under a dynamically changed transmission condition according to the first embodiment.

FIG. 6 illustrates the data collection method under a dynamically changed transmission condition according to the first embodiment. In this example, the controller 10 is notified of a determination condition for determining an event as the second transmission condition based on a result of analysis of measured data by the server 20.

By doing so, a transmission condition is changed dynamically so as to delay transmission of measured data (data 13) until predetermined timing that is to be transmitted unnecessarily in the other cases, or so as to transmit measured data of a high degree of urgency immediately that is not to be transmitted immediately in the other cases, for example.

According to the first embodiment, in the data collection system 1, the server 20 determines a degree of state abnormality occurring during control based on measured data acquired by the controller 10 in chronological order from a machine. Then, the server 20 decides a transmission condition about timing of transmission of measured data from the controller 10 to the server 20 in response to a result of the determination, and notifies the controller 10 of the decided transmission condition. The controller 10 transmits buffered measured data together to the server 20 with timing satisfying the received transmission condition. Thus, in the data collection system 1, transmission timing of transmitting measured data can be changed dynamically based on a result of the determination by the server 20 in which data is collected. The controller 10 transmits measured data together using the buffer 131. This makes it possible to transmit measured data with appropriate timing in response to a request from the server 20, while load on the controller 10 and the network is reduced. As a result, the data collection system 1 becomes capable of reducing unnecessarily frequent data transmission and delay in observation of important data.

The controller 10 detects an event to exert influence on the control using the determination condition notified from the server 20, thereby immediately transmitting measured data present in the buffer 131 at the time of the occurrence of the event in addition to transmission with timing containing a transmission frequency defined in advance. Thus, while the controller 10 transmits measured data regularly at a predetermined frequency to reduce load on the controller 10 and the network in normal time, the controller 10 transmits measured data immediately on the detection of a predetermined event. By doing so, delay in observation by the server 20 can be reduced.

The controller 10 can detect an event easily by comparing measured data with a threshold. Thus, a transmission condition can be changed dynamically in a simple way by the controller 10 based on a result of detailed analysis by the server 20.

When the data collection system 1 acquires measured data of multiple types each in chronological order, the data collection system 1 buffers the acquired measured data as data in different groups and sets a transmission condition for each group of the measured data. Thus, the data collection system 1 can transmit the measured data of the multiple types appropriately with timing differing between the types.

The server 20 determines a degree of the state abnormality occurring during the control by integrating n put information in multiple groups including measured data received from the controller 10 and relating to a series of control processes. Thus, the data collection system 1 can make the server 20 determine the state of the machine through detailed data analysis and set an appropriate transmission condition for transmitting measured data at the controller 10 in response to the state.

The server 20 determines a degree of the state abnormality occurring during the control by estimating variation until the end of the control based on a transition of the measured data. Thus, the data collection system 1 can determine a degree of the state abnormality appropriately and set the second transmission condition appropriately based on the estimation made until the end of the control.

Second Embodiment

A second embodiment of the present invention will be described below. A structure comparable to that of the first embodiment will be given the same sign, and will not be described or will be described simply.

Figure 7:
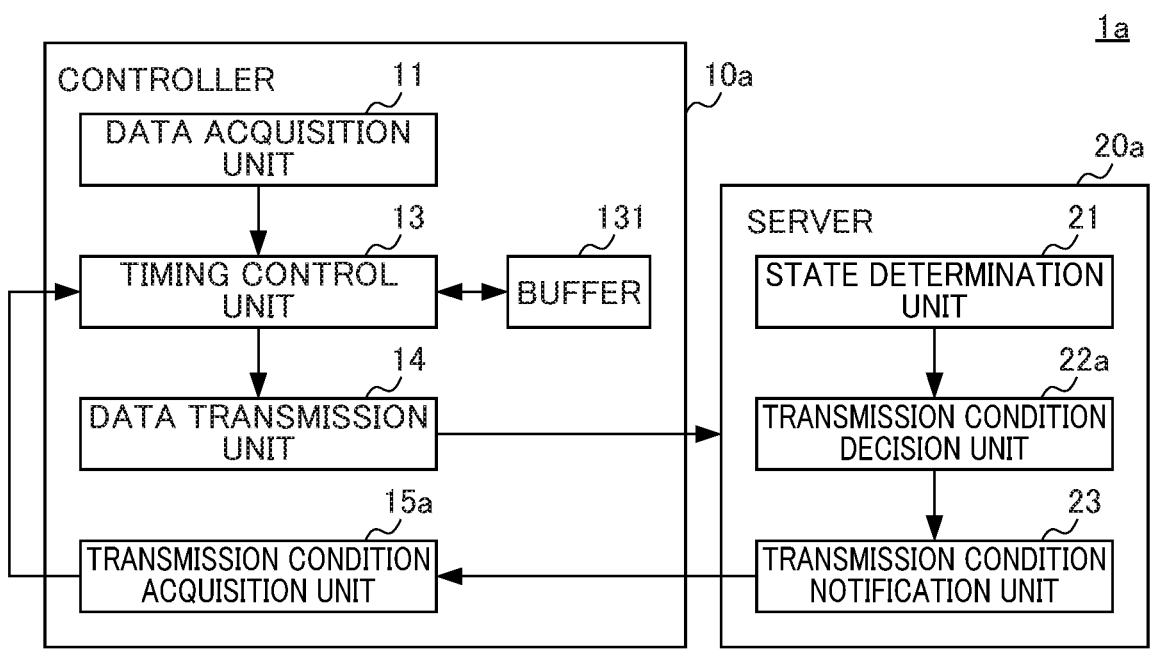
FIG. 7 shows the functional configuration of a data collection system according to a second embodiment.

FIG. 7 shows the functional configuration of a data collection system 1a according to the second embodiment. In the data collection system 1a, a controller 10a includes a transmission condition acquisition unit 15a that receives a transmission condition from the server 20 differing from a condition according to the first embodiment. More specifically, while the first transmission condition is set in advance in the first embodiment, the transmission condition acquisition unit 15a receives the first transmission condition and provides the timing control unit 13 with the received first transmission condition. The timing control unit 13 dynamically changes a transmission frequency of transmitting measured data based on the provided first transmission condition.

A server 20a includes a transmission condition decision unit 22a that decides a first transmission frequency as a frequency of observation of measured data in response to a degree of state abnormality determined by the state determination unit 21. For example, the state determination unit 21 compares a current value of the measured data and a threshold for a hazardous region necessitating handling such as machining speed reduction. Based on a difference resulting from the comparison, the state determination unit 21 determines a degree of the state abnormality. In response to the determined degree of the state abnormality, the transmission condition decision unit 22a decides the following for determining a frequency of observation: the number of pieces of data or the volume or ratio of such data to be accumulated in the buffer 131, or a time interval, for example.

As another example, if all pieces of temperature data in multiple groups measured by temperature sensors installed on corresponding positions approximate to a cautious region, the transmission condition decision unit 22a may increase a transmission frequency of transmitting these pieces of temperature data in the multiple groups so as to achieve prompt handling of temperature variation.

According to the second embodiment, the data collection system 1 makes the server 20 decide and dynamically change a transmission frequency of transmitting measured data. Thus, the data collection system 1 can set an appropriate transmission frequency of transmitting measured data responsive to a state during control, so that the server 20 can be provided with measured data at a sufficient frequency while load on the controller 10 and the network is not unnecessarily increased. This allows the server 20 to observe and analyze data efficiently.

Third Embodiment

In response to a notification from the server 20, the second transmission condition is changed dynamically in the first embodiment and the first transmission condition is changed dynamically in the second embodiment. However, these are not restrictive embodiments. More specifically, the controller 10 may be notified of both the first and second transmission conditions from the server 20, and both a determination condition for determining an event and a transmission frequency may be changed dynamically.

The data collection system 1 dynamically changes multiple transmission conditions including the first and second transmission conditions for measured data in each of multiple groups in response to a degree of state abnormality. By doing so, it becomes possible to provide measured data to the server 20 with more appropriate timing while load on the controller 10 and the network is reduced.

While the embodiments of the present invention have been described above, the present invention should not be limited to the foregoing embodiments. The effects described in the embodiments are merely a list of the most preferable effects resulting from the present invention. Effects achieved by the present invention should not be limited to those described in the embodiments.

The data collection method executed by the data collection system 1 is realized by software. To realize the data collection method by software, programs constituting the software are installed on a computer. These programs may be stored in a removable medium and distributed to a user. Alternatively, these programs may be distributed by being downloaded to a computer of the user through a network.

EXPLANATION OF REFERENCE NUMERALS

1 Data collection system
10 Controller
11 Data acquisition unit
12 Event detection unit
13 Timing control unit
14 Data transmission unit
15 Transmission condition acquisition unit
20 Server
21 State determination unit
22 Transmission condition decision unit
23 Transmission condition notification unit
131 Buffer

What is claimed is:

1. A data collection system comprising a controller that controls a machine and a server that receives measured data about the machine from the controller,
the controller comprising:
a data acquisition unit that acquires the measured data in chronological order;
a timing control unit that buffers the measured data and controls timing of transmitting the measured data to the server based on a transmission condition;
a data transmission unit, in response to an instruction by the timing control unit, that transmits the measured data to the server having been buffered until the instruction is given; and
a transmission condition acquisition unit that receives the transmission condition from the server, and
the server comprising:
a state determination unit that determines a degree of state abnormality occurring during control of the machine based on the received measured data;
a transmission condition decision unit that decides the transmission condition based on a result of the determination by the state determination unit; and
a transmission condition notification unit that notifies the controller of the transmission condition.

2. The data collection system according to claim 1, wherein
the controller comprises an event detection unit that detects the measured data satisfying a determination condition as an event to exert influence on control of the machine,
the transmission condition decision unit decides the determination condition as a second transmission condition differing from a first transmission condition containing a transmission frequency defined in advance,
the transmission condition acquisition unit receives the determination condition as the second transmission condition from the server, and
in addition to transmission with timing defined under the first transmission condition, the timing control unit instructs the data transmission unit on transmission of the measured data with timing of detection of the event differing from the timing defined under the first transmission condition.

3. The data collection system according to claim 2, wherein
the event detection unit detects the event based on a result of comparison of the measured data with a threshold as the determination condition.

4. The data collection system according to claim 1, wherein
the transmission condition decision unit decides a first transmission condition containing a defined transmission frequency, and
the transmission condition acquisition unit receives the first transmission condition from the server.

5. The data collection system according to claim 1, wherein
the data acquisition unit acquires measured data of multiple types each in chronological order, and
the transmission condition is set for measured data of each of the multiple types.

6. The data collection system according to claim 1, wherein
the state determination unit determines the degree of state abnormality occurring during the control of the machine by integrating multiple pieces of input information including the measured data.

7. The data collection system according to claim 1, wherein
the state determination unit determines the degree of state abnormality occurring during the control of the machine by estimating a variation until an end of the control of the machine based on a transition of the measured data.

8. A data collection method of causing a server to receive measured data from a controller that controls a machine,
the controller executing:
a data acquisition step of acquiring the measured data in chronological order;
a timing control step of buffering the measured data and controlling timing of transmitting the measured data to the server based on a transmission condition;
a data transmission step of, in response to an instruction by the timing control step, transmitting the measured data to the server having been buffered until the instruction is given; and
a transmission condition acquisition step of receiving the transmission condition from the server, and
the server executing:
a state determination step of determining a degree of state abnormality occurring during control of the machine based on the received measured data;
a transmission condition decision step of deciding the transmission condition based on a result of the determination by the state determination step; and
a transmission condition notification step of notifying the controller of the transmission condition.

9. A controller comprising:
a data acquisition unit that acquires measured data about a machine in chronological order;
a timing control unit that buffers the measured data and controls timing of transmitting the measured data to a server based on a transmission condition;
a data transmission unit, in response to an instruction by the timing control unit, that transmits the measured data to the server having been buffered until the instruction is given; and
a transmission condition acquisition unit that receives the transmission condition decided by the server in response to a degree of state abnormality occurring during control of the machine determined based on the transmitted measured data.

\* \* \* \* \*